United States Patent
Nishikawa et al.

(10) Patent No.: US 9,296,853 B2
(45) Date of Patent: *Mar. 29, 2016

(54) PROCESS FOR PRODUCING HYDROGENATED BLOCK COPOLYMER, HYDROGENATED BLOCK COPOLYMER OBTAINED BY THE PROCESS, AND COMPOSITION THEREOF

(75) Inventors: Takaaki Nishikawa, Ibaraki (JP); Yosuke Jogo, Chiba (JP); Nobuhiro Moriguchi, Okayama (JP); Mizuho Maeda, Chiba (JP)

(73) Assignee: KURARAY CO., LTD., Kurashiki-shi (JP)

( * ) Notice: Subject to any disclaimer, the term of this patent is extended or adjusted under 35 U.S.C. 154(b) by 171 days.

This patent is subject to a terminal disclaimer.

(21) Appl. No.: 13/375,612

(22) PCT Filed: Jun. 3, 2010

(86) PCT No.: PCT/JP2010/059447
§ 371 (c)(1),
(2), (4) Date: Feb. 16, 2012

(87) PCT Pub. No.: WO2010/140659
PCT Pub. Date: Dec. 9, 2010

(65) Prior Publication Data
US 2012/0136114 A1    May 31, 2012

(30) Foreign Application Priority Data

Jun. 3, 2009    (JP) ................................. 2009-134495

(51) Int. Cl.
*C08F 8/00*    (2006.01)
*C08F 297/04*    (2006.01)
*C08L 53/02*    (2006.01)

(52) U.S. Cl.
CPC .......... *C08F 297/046* (2013.01); *C08L 53/025* (2013.01); *C08F 2800/20* (2013.01)

(58) Field of Classification Search
CPC ..... C08F 8/04; C08F 297/046; C08F 297/044
USPC ...................................................... 524/575
See application file for complete search history.

(56) References Cited

U.S. PATENT DOCUMENTS

| | | | | |
|---|---|---|---|---|
| 5,508,333 A | * | 4/1996 | Shimizu | 524/424 |
| 5,552,493 A | * | 9/1996 | Spence et al. | 525/314 |
| 6,140,418 A | * | 10/2000 | Yamashita et al. | 525/88 |
| 2003/0232928 A1 | * | 12/2003 | Atwood et al. | 525/315 |
| 2005/0154144 A1 | * | 7/2005 | Atwood et al. | 525/314 |
| 2006/0211818 A1 | * | 9/2006 | Kurimura et al. | 525/88 |
| 2007/0167587 A1 | * | 7/2007 | Satoh et al. | 526/173 |
| 2007/0185274 A1 | | 8/2007 | Dijk et al. | |
| 2009/0247688 A1 | * | 10/2009 | Jogo et al. | 524/505 |
| 2010/0174027 A1 | * | 7/2010 | Sasaki et al. | 524/505 |
| 2011/0245405 A1 | * | 10/2011 | Jogo et al. | 524/534 |
| 2012/0136114 A1 | * | 5/2012 | Nishikawa et al. | 524/575 |
| 2012/0157615 A1 | * | 6/2012 | Nishikawa et al. | 524/575 |

FOREIGN PATENT DOCUMENTS

| | | | |
|---|---|---|---|
| EP | 1 498 455 A1 | 1/2005 | |
| EP | 1498455 A1 | * 1/2005 | ............. C08L 53/00 |
| EP | 2 439 215 A1 | 4/2012 | |
| JP | 05 070699 | 3/1993 | |
| JP | 08 337625 | 12/1996 | |
| JP | 2006 241177 | 9/2006 | |
| JP | 2006 528721 | 12/2006 | |
| JP | 2007 204751 | 8/2007 | |
| WO | WO 01/58965 A1 | 8/2001 | |
| WO | 2004 083269 | 9/2004 | |

OTHER PUBLICATIONS

Extended European Search Report issued Nov. 7, 2012, in European Patent Application No. 10783441.8.
U.S. Appl. No. 13/375,598, filed Jan. 20, 2012, Nishikawa, et al.
International Search Report Issued Aug. 3, 2010 in PCT/JP10/059447 Filed Jun. 3, 2010.

\* cited by examiner

*Primary Examiner* — Michael A Salvitti
(74) *Attorney, Agent, or Firm* — Oblon, McClelland, Maier & Neustadt, L.L.P.

(57) ABSTRACT

The present invention relates to a method for producing a hydrogenated block copolymer, including the steps of: (a) forming a block copolymer by allowing a living polymer having a specific structure to react with a tetra- or more functional silane coupling agent; (b) hydrogenating the block copolymer to form a hydrogenated block copolymer; (c) isolating the resultant hydrogenated block copolymer; and (d) deactivating a functional group in the silane coupling agent and/or an unreacted functional group present in a coupling agent residue in the block copolymer or the hydrogenated block copolymer prior to the step (c), in which the number of functional groups derived from the coupling agent in the hydrogenated block copolymer recovered in the step (c) is 1.5 or less per block copolymer molecule; a hydrogenated block copolymer obtained by the method; and a composition containing the hydrogenated block copolymer.

16 Claims, No Drawings

PROCESS FOR PRODUCING HYDROGENATED BLOCK COPOLYMER, HYDROGENATED BLOCK COPOLYMER OBTAINED BY THE PROCESS, AND COMPOSITION THEREOF

CROSS REFERENCE TO RELATED APPLICATION

This application is a 371 of PCT/JP2010/059447, filed on Jun. 3, 2010, and claims priority to Japanese Patent Application No. 2009-134495, filed on Jun. 3, 2009.

TECHNICAL FIELD

The present invention relates to a method for producing a hydrogenated block copolymer, a hydrogenated block copolymer obtained by the method, and a composition containing the hydrogenated block copolymer.

BACKGROUND ART

Conventionally, there is known, as a production method for a hydrogenated block copolymer, a method involving forming a block copolymer by allowing a living polymer having an active terminal for living anionic polymerization to react with a coupling agent and hydrogenating the block copolymer (Patent Documents 1 to 3). Such production method using a coupling agent has an advantage in that the size of a polymer block can be easily controlled to perform polymerization at a low solution viscosity. In addition, when a coupling agent having three or more functional groups is used as the coupling agent, a branched radial-type block copolymer can be obtained, and the radial-type block copolymer is known to be excellent in flowability as compared with a linear polymer having the same molecular weight.

CITATION LIST

Patent Literature

[Patent Document 1] JP 2006-528721 W
[Patent Document 2] JP 2001-163934 A
[Patent Document 3] JP 08-208781 A

SUMMARY OF INVENTION

Technical Problem

However, the production method for a radial-type block copolymer through a coupling reaction, as disclosed in each of Patent Documents 1 to 3, was found to have a problem in that an isolated hydrogenated block copolymer was liable to contain a large amount of a transition metal. If the transition metal content in the hydrogenated block copolymer is large, a composition to be obtained therefrom by kneading may turn into yellow, which is not preferred. In the above-mentioned Patent Documents, no study has been made on means for reducing the transition metal content in the hydrogenated block copolymer.

Solution to Problem

The inventors of the present invention have made extensive studies and as a result have found that, in the case where unreacted functional groups are present in a coupling agent residue present in the center of an isolated hydrogenated block copolymer, the functional groups each interact with a metal catalyst used for a hydrogenation reaction or the like, with the result that a large amount of a transition metal is contained in the hydrogenated block copolymer. Such unreacted functional groups may be produced in, for example, the case where a branching index is lowered because of large steric hindrance of a living polymer used in the coupling reaction or the like. The inventors of the present invention have further made extensive studies to solve the problem and as a result have found that the problem can be solved by performing a step of deactivating functional groups in a coupling agent and/or an unreacted functional group present in a coupling agent residue in a copolymer in production of a hydrogenated block copolymer to adjust the number of functional groups derived from the coupling agent in the hydrogenated block copolymer after the isolated step to 1.5 or less per block copolymer molecule, thus completing the present invention.

That is, the invention of the present application provides the following items [1] to [9].

[1] A method for producing a hydrogenated block copolymer, comprising the steps of:
(a) forming a block copolymer by allowing a living polymer represented by formula (I):

$$P-X \quad (I)$$

where: P represents a copolymer chain having one or more aromatic vinyl compound polymer blocks (A) and one or more conjugated diene polymer blocks (B); and X represents an active terminal of a living anionic polymer, to react with a tetra- or more functional silane coupling agent;
(b) hydrogenating the block copolymer to form a hydrogenated block copolymer;
(c) isolating the resultant hydrogenated block copolymer; and
(d) deactivating a functional group in the silane coupling agent and/or an unreacted functional group present in a coupling agent residue in the block copolymer or the hydrogenated block copolymer prior to the step (c),
in which the number of functional groups derived from the coupling agent in the hydrogenated block copolymer isolated in the step (c) is 1.5 or less per block copolymer molecule.

[2] The method for producing a hydrogenated block copolymer according to the above-mentioned item [1], in which the silane coupling agent comprises a compound represented by formula (II) or (III):

$$SiY_4 \quad (II)$$

where Y's each independently represent a fluorine atom, a chlorine atom, a bromine atom, an iodine atom, an alkoxy group, a carboxyl group or a carboxylic acid ester group; or $$R^1_m Y_{3-m}Si\text{-}A\text{-}SiY_{3-m}R^1_m \quad (III)$$

where: $R^1$'s each independently represent an aryl group having 6 to 12 carbon atoms, a linear or branched alkyl group having 1 to 12 carbon atoms or a hydrogen atom; Y's each independently represent a fluorine atom, a chlorine atom, a bromine atom, an iodine atom, an alkoxy group, a carboxyl group or a carboxylic acid ester group; A represents a single bond or a linear alkylene group having 1 to 20 carbon atoms; and m represents 0 or 1.

[3] The method for producing a hydrogenated block copolymer according to the above-mentioned item [2], in which Y's in the formula (II) or (III) represent alkoxy groups represented by $OR^2$'s, where $R^2$'s each independently represent a linear or branched alkyl group having 1 to 12 carbon atoms.

[4] The method for producing a hydrogenated block copolymer according to any one of the above-mentioned items [1] to [3], in which the functional groups derived from the coupling agent in the hydrogenated block copolymer comprise hydroxyl groups which are bonded directly to Si atoms.

[5] The method for producing a hydrogenated block copolymer according to any one of the above-mentioned items [1] to [4], in which the living polymer has a weight-average molecular weight of 8,000 to 500,000.

[6] The method for producing a hydrogenated block copolymer according to any one of the above-mentioned items [1] to [5], in which the molar ratio of the amount of a deactivating reagent used in the step (d) to the functional groups Y remaining in the coupling agent residue in the copolymer after the coupling reaction is 0.5 or more.

[7] A hydrogenated block copolymer, comprising a copolymer represented by general formula P' and/or (P')$_n$—Z, where: P' represents a copolymer chain having one or more aromatic vinyl compound polymer blocks (A) and one or more hydrogenated conjugated diene polymer blocks (B); Z represents part of a silane coupling agent represented by formula (II):

$$SiY_4 \quad (II)$$

where Y's each independently represent a fluorine atom, a chlorine atom, a bromine atom, an iodine atom, an alkoxy group, a carboxyl group or a carboxylic acid ester group, or by formula (III):

$$R^1{}_mY_{3-m}Si\text{-}A\text{-}SiY_{3-m}R^1{}_m \quad (III)$$

where: $R^1$'s each independently represent an aryl group having 6 to 12 carbon atoms, a linear or branched alkyl group having 1 to 12 carbon atoms or a hydrogen atom; Y's each independently represent a fluorine atom, a chlorine atom, a bromine atom, an iodine atom, an alkoxy group, a carboxyl group or a carboxylic acid ester group; A represents a single bond or a linear alkylene group having 1 to 20 carbon atoms; and m represents 0 or 1; and n represents an integer of 1 to 6, in which the hydrogenated block copolymer has a branching index of 2.3 or more and the number of functional groups derived from a coupling agent in the hydrogenated block copolymer is 1.5 or less per block copolymer molecule.

[8] The hydrogenated block copolymer according to the above-mentioned item [7], which is obtained by the method according to any one of the above-mentioned items [1] to [6].

[9] A thermoplastic elastomer composition, comprising: the hydrogenated block copolymer according to the above-mentioned item [7] or [8]; and a non-aromatic rubber softener at a ratio of 1 to 2,000 parts by mass with respect to 100 parts by mass of the hydrogenated block copolymer.

Advantageous Effects of Invention

According to the present invention, it is possible to provide the radial-type hydrogenated block copolymer having a low transitional metal content and the method for producing the same.

DESCRIPTION OF EMBODIMENTS

Hereinafter, the present invention is described in detail.

A method of the present invention is a method for producing a hydrogenated block copolymer, comprising the steps of (a) forming a block copolymer by allowing a living polymer having a specific structure to react with a tetra- or more functional silane coupling agent;

(b) hydrogenating the block copolymer to form a hydrogenated block copolymer;

(c) isolating the resultant hydrogenated block copolymer; and (d) deactivating a functional group in the silane coupling agent and/or an unreacted functional group present in a coupling agent residue in the block copolymer or the hydrogenated block copolymer prior to the step (c), in which the number of functional groups derived from the coupling agent in the hydrogenated block copolymer isolated in the step (c) is 1.5 or less.

[Step (a)]

The living polymer to be used in the step (a) of forming a block copolymer is a living polymer represented by formula (I):

$$P\text{—}X \quad (I)$$

(where: P represents a copolymer chain having one or more aromatic vinyl compound polymer blocks (A) and one or more conjugated diene polymer blocks (B); and X represents an active terminal of a living anionic polymer).

The polymer block (A) in the copolymer chain P mainly comprises a structural unit derived from an aromatic vinyl compound (aromatic vinyl compound unit). Here, the term "mainly" means that the aromatic vinyl compound unit is preferably contained in an amount of 70% by mass or more, more preferably 90% by mass or more, still more preferably 100% by mass based on the mass of the polymer block (A).

Examples of the aromatic vinyl compound comprised in the polymer block (A) include styrene, α-methylstyrene, 2-methylstyrene, 3-methylstyrene, 4-methylstyrene, 4-propylstyrene, 4-cyclohexylstyrene, 4-dodecylstyrene, 2-ethyl-4-benzylstyrene, 4-(phenylbutyl)styrene, 1-vinylnaphthalene and 2-vinylnaphthalene.

The polymer block (A) may comprise only a structural unit derived from one kind of the aromatic vinyl compounds or may comprise structural units derived from two or more kinds thereof. Among them, it is preferred that the polymer block (A) mainly comprises a structural unit derived from styrene or α-methylstyrene.

The polymer block (A) may include a small amount of a structural unit derived from an additional copolymerizable monomer together with the structural unit derived from the aromatic vinyl compound. In this case, the ratio of the structural unit derived from the additional copolymerizable monomer is preferably less than 30% by mass, more preferably less than 10% by mass based on the mass of the polymer block (A).

Examples of the additional copolymerizable monomer include anionically polymerizable monomers such as a methacrylic acid ester, an acrylic acid ester, 1-butene, pentene, hexene, 1,3-butadiene, isoprene and methyl vinyl ether. The bond form of the units based on the additional copolymerizable monomer may be any form such as a random or tapered form.

The polymer block (B) in the copolymer chain P mainly comprises a structural unit derived from a conjugated diene (conjugated diene unit). Here, the term "mainly" means that the conjugated diene unit is preferably contained in an amount of 70% by mass or more, more preferably 90% by mass or more, still more preferably 100% by mass based on the mass of the polymer block (B).

Examples of the conjugated diene comprised in the polymer block (B) include 1,3-butadiene, isoprene, 2,3-dimethyl-1,3-butadiene, 1,3-pentadiene and 1,3-hexadiene.

The polymer block (B) may comprise only a structural unit derived from one kind of the conjugated dienes or may comprise structural units derived from two or more kinds thereof. Among them, it is preferred that the polymer block (B) mainly comprises a structural unit derived from 1,3-butadiene, isoprene, or a mixture of 1,3-butadiene and isoprene, more preferably a structural unit derived from a mixture of 1,3-butadiene and isoprene. In the case where the polymer block (B) has structural units derived from two or more kinds of conjugated dienes, the bond form of the units may be a random, block or tapered form, or a combination of two or more kinds thereof.

The polymer block (B) may include a small amount of a structural unit derived from an additional copolymerizable monomer together with the structural unit derived from the conjugated diene to the extent that the object of the present invention is not impaired. In this case, the ratio of the structural unit derived from the additional copolymerizable monomer is preferably less than 30% by mass, more preferably less than 10% by mass based on the mass of the polymer block (B).

Examples of the additional copolymerizable monomer include anionically polymerizable monomers including aromatic vinyl compounds such as styrene, α-methylstyrene, o-methylstyrene, m-methylstyrene, p-methylstyrene, 1,3-dimethylstyrene, diphenylethylene, 1-vinylnaphthalene, 4-propylstyrene, 4-cyclohexylstyrene, 4-dodecylstyrene, 2-ethyl-4-benzylstyrene and 4-(phenylbutyl)styrene. Those additional copolymerizable monomers may be used alone or in combination of two or more kinds thereof. In the case of copolymerization of the structural unit derived from the conjugated diene and the structural unit derived from the additional copolymerizable monomer such as the aromatic vinyl compound, the bond form of the units may be any of random and tapered forms.

The polymer block (B) is hydrogenated in the step of hydrogenation. From the viewpoint of heat resistance and weather resistance, in the hydrogenated polymer block (B) in the hydrogenated block copolymer of the present invention, carbon-carbon double bonds derived from the conjugated diene are hydrogenated at a ratio of preferably 50% or more, more preferably 80% or more, still more preferably 90% or more. It should be noted that the hydrogenation degree may be determined from measured values obtained by measuring the contents of the carbon-carbon double bonds derived from the conjugated diene unit in the polymer block (B) before and after the hydrogenation by iodine value measurement, infrared spectrophotometer, $^1$H-NMR spectrum, or the like.

The bond forms (microstructures) of the structural unit derived from the conjugated diene in the polymer block (B) and the abundance ratios thereof are not particularly limited. For example, a unit derived from 1,3-butadiene may have a bond form of a 1,2-bond (vinyl bond) or a 1,4-bond, and a unit derived from isoprene may have a bond form of a 1,2-bond (vinyl bond), a 3,4-bond (vinyl bond) or a 1,4-bond. Only one kind of the bond forms may be present, or two or more kinds thereof may be present. Further, any of the bond forms may be present at any ratio. Moreover, in the case where the polymer block (B) comprises only a structural unit derived from 1,3-butadiene, the amount of the 1,2-bond (amount of the vinyl bond) is preferably adjusted to 25% or more in order to prevent deterioration of the performance of the elastomer by crystallization caused after hydrogenation.

The copolymer chain P has one or more polymer blocks (A) and one or more polymer blocks (B). The bond form of the polymer block (A) and polymer block (B) is not particularly limited and may be any of linear, branched and radial forms, or a bond form formed of a combination of two or more thereof. The content of the polymer blocks (A) is preferably 5 to 70% by mass, more preferably 10 to 55% by mass, particularly preferably 15 to 45% by mass with respect to the total amount of the hydrogenated block copolymer. In the case where the content of the polymer blocks (A) is less than 5% by mass, the resultant thermoplastic elastomer composition may have poor heat resistance, while in the case where the content exceeds 70% by mass, the hydrogenated block copolymer is liable to have an excessively high melt viscosity, resulting in poor processability, and the resultant thermoplastic elastomer composition may have poor flexibility, which is not preferred.

When the polymer block (A) and polymer block (B) are represented by A and B, respectively, specific examples of the copolymer chain include a diblock type represented by [A-B-] or [B-A-], a triblock type represented by [A-B-A-] or [B-A-B-], a tetrablock type represented by [A-B-A-B-] or [B-A-B-A-], or a polyblock type formed by linearly bonding 5 or more of A('s) and B('s). Among them, the diblock type represented by [A-B-] and the triblock type represented by [A-B-A-] or [B-A-B-] are preferred because the polymer blocks (A) (hard block) are bonded via the polymer block (B) (soft block) in a block copolymer after a coupling reaction, resulting in excellent rubber elasticity.

The copolymer chain P may have one kind or two or more kinds of functional groups such as a carboxyl group, a hydroxyl group, an acid anhydride group, an amino group and an epoxy group in the molecular chain and/or at the end of the molecular chain as long as the object and effect of the present invention are not prevented. It should be noted that the functional groups may be introduced into the block copolymer after a coupling reaction or a hydrogenation reaction. As a method for the introduction, there is given, for example, a method involving allowing the copolymer to react with maleic anhydride.

In the hydrogenated block copolymer of the present invention, the molecular weights of the polymer block (A) and polymer block (B) are not particularly limited. However, from the viewpoint of heat resistance and processability of the resultant thermoplastic elastomer composition, the weight-average molecular weight of each polymer block (A) is preferably 3,000 to 100,000, more preferably 5,000 to 70,000, and the weight-average molecular weight of each polymer block (B) is preferably 5,000 to 400,000, more preferably 10,000 to 200,000.

The weight-average molecular weight of the living polymer before hydrogenation is preferably 8,000 or more, more preferably 15,000 or more, still more preferably 30,000 or more, most preferably 60,000 or more. Further, the weight-average molecular weight of the living polymer is preferably 500,000 or less, more preferably 400,000 or less, still more preferably 300,000 or less. When the weight-average molecular weight of the living polymer is large, the branching index tends to become small to increase the number of unreacted functional groups. Thus, the effect of the present invention is more effectively exerted in that range. It should be noted that the weight-average molecular weight of the living polymer may be estimated to be almost the same value as the weight-average molecular weight of an uncoupled polymer component.

The weight-average molecular weight of the whole hydrogenated block copolymer is preferably 16,000 or more, more preferably 30,000 or more, still more preferably 60,000 or more, most preferably 70,000 or more. Further, the weight-average molecular weight of the whole hydrogenated block copolymer is preferably 1,000,000 or less, more preferably 800,000 or less, most preferably 600,000 or less. If the weight-average molecular weight of the hydrogenated block copolymer is less than 16,000, the resultant thermoplastic elastomer composition may have insufficient heat resistance, while if the weight-average molecular weight exceeds 1,000,000, the resultant thermoplastic elastomer composition may have poor processability.

It should be noted that the term "weight-average molecular weight" as used herein means a weight-average molecular weight in terms of polystyrene determined by gel permeation chromatography (GPC) measurement.

The living polymer can be produced by a known polymerization method. In general, an intended living polymer can be obtained by sequentially polymerizing monomers using an alkyl lithium compound as an initiator in an inert solvent.

Examples of the alkyl lithium compound include methyl lithium, ethyl lithium, n-butyl lithium, sec-butyl lithium, tert-butyl lithium, and pentyl lithium.

The polymerization is preferably preformed in the presence of a solvent. The solvent is not particularly limited as long as the solvent is inert to the initiator and has no adverse effect on the reaction, and examples thereof include saturated aliphatic hydrocarbons and aromatic hydrocarbons, such as hexane, cyclohexane, heptane, octane, decane, toluene, benzene, and xylene. In addition, the polymerization reaction is usually performed at a temperature ranging from 0 to 100° C. for 0.5 to 50 hours.

Further, a Lewis base may be used as a co-catalyst during the polymerization. Examples of the Lewis base include: ethers such as dimethyl ether, diethyl ether and tetrahydrofuran; glycol ethers such as ethylene glycol dimethyl ether and diethylene glycol dimethyl ether; and amines such as triethylamine, N,N,N',N'-tetramethylethylenediamine and N-methylmorpholine. One kind of those Lewis bases may be used alone, or two or more kinds thereof may be used.

The coupling agent used in the production method of the present invention is a tetra- or more functional silane coupling agent, i.e., a silane coupling agent having four or more functional groups each capable of reacting with the active terminal of the living polymer.

Examples of the tetra- or more functional silane coupling agent include a mono-silyl compound represented by formula (II):

$$SiY_4 \quad (II)$$

(where Y's each independently represent a fluorine atom, a chlorine atom, a bromine atom, an iodine atom, an alkoxy group, a carboxyl group, or a carboxylic acid ester group) and a bis-silyl compound represented by formula (III):

$$R^1_m Y_{3-m}Si\text{-}A\text{-}SiY_{3-m}R^1_m \quad (III)$$

(where: $R^1$'s each independently represent an aryl group having 6 to 12 carbon atoms, a linear or branched alkyl group having 1 to 12 carbon atoms, or a hydrogen atom; Y's each independently represent a fluorine atom, a chlorine atom, a bromine atom, an iodine atom, an alkoxy group, a carboxyl group, or a carboxylic acid ester group; A represents a single bond or a linear alkylene group having 1 to 20 carbon atoms; and m represents 0 or 1).

The mono-silyl compound represented by formula (II) is preferred because it is easily available. Meanwhile, when the bis-silyl compound represented by formula (III) is used as a coupling agent, it is possible to suppress effects of steric hindrance and to increase the number of functional groups involved in the coupling reaction to reduce the number of unreacted functional groups.

Examples of the coupling agent represented by formula (II) include: alkoxysilane coupling agents such as tetramethoxysilane, tetraethoxysilane, tetrapropoxysilane, and tetrabutoxysilane; and halosilane coupling agents such as tetrachlorosilane, tetrabromosilane, and tetrafluorosilane.

Examples of the coupling agent represented by formula (III) include: alkoxysilane coupling agents such as bisdimethoxymethylsilylethane, bisdiethoxymethylsilylethane, bisdiethoxyethylsilylpentane, bisdibutoxymethylsilylethane, bistrimethoxysilylhexane, bistriethoxysilylethane, and bistripropoxysilylpentane; and halosilane coupling agents such as bisdichloromethylsilylethane, bisdibromoethylsilylhexane, bisdibromopropylsilylheptane, bistrichlorosilylethane, and bistribromosilylhexane.

From the viewpoint of environment safety and reactivity, the coupling agent is preferably a compound having an alkoxy group as a functional group. Therefore, in the coupling agent represented by formula (II) or (III), Y's (hereinafter, sometimes referred to as functional groups Y) preferably represent alkoxy groups represented by $OR^2$'s (where $R^2$'s each independently represent a linear or branched alkyl group having 1 to 12 carbon atoms).

Examples of the coupling agent in which the functional groups Y represent alkoxy groups include: tetraalkoxysilane compounds such as tetramethoxysilane, tetraethoxysilane, tetrapropoxysilane, and tetrabutoxysilane; and bisalkoxysilylalkane compounds such as bisdimethoxymethylsilylethane, bisdiethoxymethylsilylethane, bisdiethoxyethylsilylpentane, bisdibutoxymethylsilylethane, bistrimethoxysilylhexane, bistriethoxysilylethane, and bistripropoxysilylpentane. Among them, tetramethoxysilane, tetraethoxysilane, bisdiethoxymethylsilylethane, and bistriethoxysilylethane are preferred.

The number of the functional groups Y included per molecule of the coupling agent is preferably 4 to 6, more preferably 4 to 5. As the number of the functional groups Y becomes larger, the resultant polymer tends to more easily form a radial structure. On the other hand, as the number of the functional groups Y becomes smaller, the number of unreacted functional groups in a coupling residue after the coupling reaction becomes smaller. Therefore, the transition metal content in the resultant hydrogenated block copolymer tends to decrease, which enables reduction of the amount of a reagent added for deactivating the functional groups Y.

In order to adjust the number of the functional groups Y included per coupling agent molecule to a preferred range, a compound initially having a desired number of the functional groups may be used, or part of the functional groups of a compound having the functional groups in a number larger than a desired number may be deactivated in advance through the step (d) before use.

The amount of the coupling agent is very important in determining the number of arms in the radial structure. The molar ratio of the coupling agent to an active terminal is independent of the number of functional groups in the coupling agent and is preferably 0.1 to 0.5, more preferably 0.2 to 0.4. If the molar ratio of the coupling agent to the active terminal is less than 0.1, many radial structures having many arms are produced, but the coupling efficiency becomes low because the amount of the coupling agent is small. On the other hand, if the molar ratio of the coupling agent to the active terminal is larger than 0.5, the coupling efficiency becomes high, but polymers each having the radial structure are hardly produced because many two-arm polymers (linear polymers) are produced.

Meanwhile, the coupling reaction is usually performed at a temperature ranging from 0 to 100° C. for 0.5 to 50 hours. The coupling agent may be diluted before use, and a solvent for dilution is not particularly limited as long as the solvent is inert to the active terminal and has no adverse effect on the reaction. Examples thereof include saturated aliphatic hydrocarbons and aromatic hydrocarbons, such as hexane, cyclohexane, heptane, octane, decane, toluene, benzene, and xylene. Further, in the coupling reaction, a Lewis base may be added as an additive, and examples of the Lewis base include: ethers such as dimethyl ether, diethyl ether, and tetrahydrofuran; glycol ethers such as ethylene glycol dimethyl ether and diethylene glycol dimethyl ether; and amines such as triethylamine, N,N,N',N'-tetramethylethylenediamine, and N-methylmorpholine. One kind of those Lewis bases may be used alone, or two or more kinds thereof may be used in combination.

The coupling ratio in a reaction of the living polymer with the coupling agent is preferably 50% or more, more preferably 60% or more, still more preferably 70% or more. If the coupling ratio is less than 50%, the strength of the resultant thermoplastic elastomer composition decreases, which is not preferred.

By using elution curves which are obtained by gel permeation chromatography (GPC), it is possible to obtain the coupling ratio by dividing a peak area of a polymer produced by coupling by the sum of the peak area of the polymer produced by coupling and a peak area of an uncoupled polymer. That is, the coupling ratio can be determined by the following equation.

Coupling ratio (%)=(peak area of polymer produced by coupling)/(sum of peak area of polymer produced by coupling and peak area of uncoupled polymer)×100

The coupling ratio can be increased by increasing the amount of the coupling agent added, raising the reaction temperature, or lengthening the reaction time.

The branching index of the hydrogenated block copolymer is preferably 2.3 or more, more preferably 2.4 or more, still more preferably 2.6 or more. The term "branching index" as used herein refers to an index determined by dividing the weight-average molecular weight (Mw) of a polymer produced by coupling by the weight-average molecular weight (Mw) of an uncoupled polymer, which are determined by gel permeation chromatography (GPC) measurement. That is, the branching index can be determined by the following equation.

Branching index=(weight-average molecular weight (Mw) of polymer produced by coupling)/ (weight-average molecular weight (Mw) of uncoupled polymer)

The branching index can be controlled by the number of functional groups each capable of reacting with the active terminal of a living anionic polymer of a coupling agent. In general, when a coupling agent having many functional groups each capable of reacting with the active terminal of the living anionic polymer is used, a block copolymer having a high branching index can be obtained. When a coupling agent having three or more functional groups each capable of reacting with the active terminal is used, the branching index can be increased to 2.3 or more. When the branching index of the hydrogenated block copolymer is increased by using a coupling agent having many functional groups, the number of unreacted functional groups Y usually tends to become large after the coupling reaction. Therefore, in the case of production of a hydrogenated block copolymer having a large branching index, the effect of the present invention can be exerted more effectively.

[Step (b)]

Coupling and hydrogenation may be performed successively, or hydrogenation may be performed after the block copolymer is isolated once.

In the case where the block copolymer is isolated, the block copolymer may be isolated by, after performing the polymerization by the above-mentioned method, pouring the polymerization reaction solution into a poor solvent of the block copolymer, such as methanol to solidify the block copolymer, or pouring the polymerization reaction solution into hot water together with steam to remove the solvent by azeotropy (steam stripping) and drying the resultant product.

The hydrogenation reaction of the block copolymer can usually be performed in the presence of a hydrogenation catalyst such as: a Ziegler catalyst composed of a combination of a transition metal compound (such as nickel octylate, nickel neodecanoate, nickel naphthenate, nickel acetylacetonate, cobalt octylate, cobalt neodecanoate, cobalt naphthenate, or cobalt acetylacetonate) and an organic aluminum compound such as triethyl aluminum or triisobutyl aluminum, an organic lithium compound, or the like; or a metallocene catalyst composed of a combination of a bis(cyclopentadienyl) compound of a transition metal such as titanium, zirconium, or hafnium and an organic metal compound including lithium, sodium, potassium, aluminum, zinc, magnesium, or the like under conditions of a reaction temperature of 20 to 200° C., a hydrogen pressure of 0.1 to 20 MPa, and a reaction time of 0.1 to 100 hours.

[Step (c)]

In the case where coupling and hydrogenation are performed successively, the hydrogenated block copolymer may be isolated by pouring the hydrogenation reaction solution into a poor solvent of the hydrogenated block copolymer, such as methanol, to solidify the hydrogenated block copolymer, or pouring the hydrogenation reaction solution into hot water together with steam to remove the solvent by azeotropy (steam stripping) and drying the resultant product.

Before the isolation of the hydrogenated block copolymer, the polymer solution is washed with water to reduce the amount of a metal catalyst in the isolated hydrogenated block copolymer. When washing is performed using an acidic aqueous solution, the efficiency of washing can further be improved. An acid to be used is preferably exemplified by: a monovalent or polyvalent strong acid such as hydrochloric acid, nitric acid, or sulfuric acid; a monovalent or polyvalent carboxylic acid such as acetic acid, propionic acid, succinic acid, or citric acid; and a monovalent or polyvalent weak acid such as carbonic acid or phosphoric acid.

[Step (d)]

The production method of the present application includes (d) the step of deactivating functional groups in the silane coupling agent and/or unreacted functional groups present in a coupling agent residue in the block copolymer or the hydrogenated block copolymer prior to the step (c) as a means to reducing the number of residual functional groups in the hydrogenated block copolymer.

The unreacted functional groups present in the coupling agent residue in the hydrogenated block copolymer may react with an acid added in the isolating step (c) to produce hydroxyl groups, which may interact with a metal catalyst. Therefore, the deactivation step (d) needs to be performed prior to the isolating step (c).

That is, in the production method of the present invention, in the case where part of the functional groups of a compound having functional groups in a number larger than a desired number as the coupling agent is deactivated prior to use, the order of "step (d)→step (a)→step (b)→step (c)" may be adopted, or in the case where the unreacted functional groups Y present in the coupling agent residue in the copolymer after the coupling reaction are deactivated, the order of "step (a)→step (d)→step (b)→step (c)" or "step (a)→step (b)→step (d)→step (c)" may be adopted.

Examples of the reagent used for deactivating the functional groups Y (hereinafter, sometimes referred to as deactivating reagent) include Lewis bases including: alkyl lithiums such as methyl lithium, ethyl lithium, n-propyl lithium, isopropyl lithium, n-butyl lithium, sec-butyl lithium, and t-butyl lithium; alkyl sodiums such as methyl sodium, ethyl sodium, n-propyl sodium, isopropyl sodium, n-butyl sodium, sec-butyl sodium, and t-butyl sodium; alkyl potassiums such as methyl potassium, ethyl potassium, n-propyl potassium, isopropyl potassium, n-butyl potassium, sec-butyl potassium, and t-butyl potassium; alkyl magnesium halides such as methyl magnesium bromide, ethyl magnesium bromide, t-butyl magnesium bromide, t-butyl magnesium chloride, and sec-butyl magnesium iodide; dialkyl copper lithiums such as dimethyl copper lithium, diethyl copper lithium, methyl ethyl copper lithium, methyl n-propyl copper lithium, and ethyl n-butyl copper lithium; and lithium amides such as lithium diisopropyl amide, lithium diisoethyl amide, and lithium di-t-butyl amide.

Among them, in the case where part of the functional groups of a compound having functional groups in a number larger than a desired number as the coupling agent is deactivated prior to use, methyl lithium, methyl magnesium bromide, and dimethyl copper lithium are preferred because steric hindrance of the coupling agent after deactivation is small in the coupling reaction.

Meanwhile, in the case where the unreacted functional groups Y present in the coupling agent residue in the copolymer after the coupling reaction are deactivated, methyl lithium, methyl magnesium bromide, and dimethyl copper lithium are preferred because steric hindrance is desirably small to progress the deactivation reaction rapidly.

The molar ratio of the amount of the deactivating reagent used in the step (d) to the functional groups Y remaining in the coupling agent residue in the copolymer after the coupling reaction is preferably 0.5 or more, more preferably 1.0 or more and is preferably 100 or less, more preferably 50 or less. In the case where the amount of the deactivating reagent is insufficient, the number of the residual functional groups tends not to become 1.5 or less, resulting in increasing the transition metal content in a hydrogenated block copolymer obtained as a final product.

The deactivation reaction of the functional groups Y is usually performed at a temperature ranging from 0 to 100° C. for 0.1 to 50 hours. The deactivating reagent may be diluted before use, and a solvent for dilution is not particularly limited as long as the solvent is inert to the deactivating reagent and has no adverse effect on the reaction. Examples thereof include saturated aliphatic hydrocarbons and aromatic hydrocarbons, such as hexane, cyclohexane, heptane, octane, decane, toluene, benzene, and xylene. Further, in the deactivation reaction of the functional groups Y, a Lewis base may be added as an additive, and examples of the Lewis base include: ethers such as dimethyl ether, diethyl ether, and tetrahydrofuran; glycol ethers such as ethylene glycol dimethyl ether and diethylene glycol dimethyl ether; and amines such as triethylamine, N,N,N',N'-tetramethylethylenediamine, and N-methylmorpholine. One kind of those Lewis bases may be used alone, or two or more kinds thereof may be used in combination.

[Hydrogenated Block Copolymer]

The hydrogenated block copolymer obtained by the production method of the present invention is a hydrogenated block copolymer including a copolymer represented by general formula P' and/or $(P')_n$—Z, in which the hydrogenated block copolymer has a branching index of 2.3 or more and the number of functional groups derived from the coupling agent in the hydrogenated block copolymer is 1.5 or less per block copolymer molecule. Here, P' represents a copolymer chain having one or more aromatic vinyl compound polymer blocks (A) and one or more hydrogenated conjugated diene polymer blocks (B), Z represents part of a silane coupling agent represented by the formula (II) or (III), and n represents an integer of 1 to 6.

That is, the hydrogenated block copolymer of the present invention is a mixture of:

(1) a radial-type hydrogenated block copolymer having six arms, which is represented by general formula $(P')_6$—Z;
(2) a radial-type hydrogenated block copolymer having five arms, which is represented by general formula $(P')_5$—Z;
(3) a radial-type hydrogenated block copolymer having four arms, which is represented by general formula $(P')_4$—Z;
(4) a radial-type hydrogenated block copolymer having three arms, which is represented by general formula $(P')_3$—Z;
(5) a linear hydrogenated block copolymer having two arms, which is represented by general formula $(P')_2$—Z;
(6) a linear hydrogenated block copolymer having one arm, which is represented by general formula P'—Z; and
(7) a linear hydrogenated block copolymer represented by general formula P'. It should be noted that component ratios of the copolymers (1) to (7) in the hydrogenated block copolymer of the present invention may be appropriately determined depending on the types of the living polymer used as a raw material and the silane coupling agent, and reaction conditions.

[Number of Residual Functional Groups in Hydrogenated Block Copolymer]

In the production method of the present invention, it is important that the number of functional groups derived from the coupling agent in the resultant hydrogenated block copolymer (residual functional groups) be 1.5 or less, preferably 1.3 or less per block copolymer molecule. The phrase "functional groups derived from the coupling agent" as used herein comprises functional groups remaining in the coupling agent without any reactions and hydroxyl groups produced by hydrolysis of the functional groups in the coupling agent. If the number of the residual functional groups is 1.5 or less, an interaction between each of the residual functional groups and a metal catalyst used for a hydrogenation reaction or the like can be suppressed, allowing production of a hydrogenated block copolymer having a low transition metal content. The number of the residual functional groups can be reduced by using a coupling agent having a small number of functional groups or by deactivating unreacted functional groups after the coupling reaction.

In the case where, of the residual functional groups, hydroxyl groups which are bonded directly to Si atoms produced by hydrolysis of the functional groups Y (silanol groups) each interact with a transition metal, the transition metal is particularly sterically restricted, and hence the transition metal content in the hydrogenated block copolymer obtained as a final product is affected. Therefore, it is important that the number of the silanol groups in the resultant hydrogenated block copolymer be 1.5 or less, preferably 1.3 or less per block copolymer molecule.

The number of the functional groups derived from the coupling agent (residual functional groups) can be determined from the results of $^{29}$Si-NMR measurement of a solution of the polymer in deuterated chloroform. Specifically, the number can be calculated by summating values obtained by multiplying integrated values of Si having no residual functional group, Si having one residual functional group, Si having two residual functional groups, etc. by the number of the functional groups and comparing the sum with the simple sum of the integrated values. It should be noted that the results of $^{29}$Si-NMR measurement are hardly affected by a change in the number of protons by hydrogenation, and hence the number of functional groups Y before hydrogenation is calculated to be almost the same as the number of residual functional groups after hydrogenation.

[Transition Metal Content in Hydrogenated Block Copolymer]

According to the production method of the present invention, it is possible to produce a hydrogenated block copolymer having a low transition metal content. Specifically, the transition metal content measured by an atomic absorption method is preferably 100 ppm or less, more preferably 80 ppm or less, still more preferably 50 ppm or less. If the transition metal content exceeds the above-mentioned range, in the case where a thermoplastic elastomer composition is prepared by kneading the hydrogenated block copolymer together with another component, the resultant thermoplastic elastomer composition may turn yellow, which is not preferred.

[Thermoplastic Elastomer Composition]

The thermoplastic elastomer composition of the present invention includes the above-mentioned hydrogenated block copolymer and a non-aromatic rubber softener. The term "non-aromatic rubber softener" as used in the present invention refers to a rubber softener in which the number of carbon atoms in an aromatic ring accounts for less than 35% of the number of carbon atoms in the whole molecule.

The thermoplastic elastomer composition of the present invention may comprise one kind of the hydrogenated block copolymer or a mixture of two or more kinds of the hydrogenated block copolymers.

Examples of the non-aromatic rubber softener include: mineral oils such as a paraffin-based process oil and a naphthenic process oil; vegetable oils such as a peanut oil and a rosin; phosphoric acid esters; low-molecular-weight polyethylene glycol; liquid paraffins; and synthetic oils such as low-molecular-weight ethylene, an ethylene-α-olefin copolymerization oligomer, liquid polybutene, liquid polyisoprene or a hydrogenated product thereof, and liquid polybutadiene or a hydrogenated product thereof. Among them, in view of compatibility with the hydrogenated block copolymer, a paraffin oil such as a paraffin-based process oil or a liquid paraffin is suitably used. The term "paraffin oil" as used herein refers to an oil in which the number of carbon atoms in a paraffin chain accounts for 50% or more of the number of carbon atoms in the whole molecule. The paraffin oil has a kinetic viscosity at 40° C. in the range of preferably 10 to 500 mm$^2$/s, more preferably 15 to 400 mm$^2$/s, still more preferably 20 to 300 mm$^2$/s. One kind of those softeners may be used alone, or two or more kinds thereof may be used in combination.

The non-aromatic rubber softener content in the thermoplastic elastomer composition of the present invention is in the range of preferably 1 to 2,000 parts by mass, more preferably 25 to 1,500 parts by mass, still more preferably 100 to 1,300 parts by mass with respect to 100 parts by mass of the hydrogenated block copolymer. In the case where the content exceeds 2,000 parts by mass, the strength of the resultant thermoplastic elastomer composition is liable to become significantly lower.

In addition, with regard to the non-aromatic rubber softener content in the thermoplastic elastomer composition of the present invention, the non-aromatic rubber softener content with respect to the whole thermoplastic elastomer composition is preferably 1% by mass or more, more preferably 20% by mass or more, still more preferably 50% by mass or more. In the case where the non-aromatic rubber softener content is less than 1% by mass, the moldability of the resultant thermoplastic elastomer composition is liable to become lower.

In the thermoplastic elastomer composition of the present invention, an additional thermoplastic resin may be blended depending on the intended use. Examples of the thermoplastic resin include: polyolefin-based resins including polypropylene, high-density polyethylene, medium-density polyethylene, low-density polyethylene, ethylene-α-olefin copolymers such as an ethylene-propylene copolymer, an ethylene-1-butene copolymer, an ethylene-1-hexene copolymer, an ethylene-1-heptene copolymer, an ethylene-1-octene copolymer, an ethylene-4-methyl-1-pentene copolymer, an ethylene-1-nonene copolymer, and an ethylene-1-decene copolymer, an ethylene-vinyl acetate copolymer, an ethylene-acrylic acid copolymer, an ethylene-acrylic acid ester copolymer, an ethylene-methacrylic acid copolymer, an ethylene-methacrylic acid ester copolymer, and resins obtained by modifying those polymers with maleic anhydride and the like; polystyrene-based resins such as polystyrene, poly-α-methylstyrene, polyparamethylstyrene, an acrylonitrile-styrene resin, an acrylonitrile-butadiene-styrene resin, a maleic anhydride-styrene resin, and polyphenylene ether; and thermoplastic elastomers such as an olefin-based elastomer, a styrene-based elastomer, a urethane-based elastomer, an amide-based elastomer, and a polyester-based elastomer. One kind of those thermoplastic resins may be used alone, or two or more kinds thereof may be used in combination. In the case where the additional thermoplastic resin is blended, from the viewpoint of flexibility, the amount of the resin blended is preferably 1 to 900 parts by mass with respect to 100 parts by mass of the hydrogenated block copolymer.

In the thermoplastic elastomer composition of the present invention, a variety of additives may be blended depending on the intended use in addition to the above-mentioned components. Examples of the additives include an antioxidant, a light stabilizer, an ultraviolet absorber, a lubricant, various fillers, an antifogging agent, an anti-blocking agent, a colorant, a flame retardant, an antistat, a crosslinking agent, a conductivity-imparting agent, an antibacterial agent, an antifungal agent, and a foaming agent. Any one kind of those additives may be used alone, or any two or more kinds thereof may be used in combination. In the case where the additive is blended, the amount of the additive blended is, from the viewpoint of tensile strength, preferably 10 parts by mass or less with respect to 100 parts by mass in total of the hydrogenated block copolymer and non-aromatic rubber softener.

The thermoplastic elastomer composition of the present invention can be produced by mixing the hydrogenated block copolymer, non-aromatic rubber softener, and additional components. The mixing can be performed by a conventional method, for example, by mixing the components homogeneously using a mixing device such as a Henschel mixer, a ribbon blender, or a V-shaped blender, and then melt-kneading the mixture using a kneading device such as a mixing roll, a kneader, a Banbury mixer, a Brabender mixer, or a single-screw or twin-screw extruder. In general, the kneading is performed at 120 to 300° C.

EXAMPLES

Hereinafter, the present invention is described in more detail by way of examples, but is not limited to the examples. It should be noted that, in the examples and comparative examples below, physical properties of hydrogenated block copolymers and thermoplastic elastomer compositions were evaluated by the following methods.

(1) Hydrogenation Degree, Styrene Content, and Vinyl Bond Amount

Values were calculated from $^1$H-NMR spectra.
Device: AVANCE 400 Nanobay (product name, manufactured by BRUKER)
Solvent: deuterated chloroform
Measurement temperature: 320 K (2) Weight-Average Molecular Weight (Mw) and Molecular Weight Distribution (Mw/Mn)

The weight-average molecular weight (Mw), number-average molecular weight (Mn), and molecular weight distribution (Mw/Mn) of a total of a coupled polymer component and an uncoupled polymer component were determined in terms of polystyrene by gel permeation chromatography (GPC).
Device: GPC-8020 (product name, manufactured by Tosoh Corporation)
Detector: RI
Solvent: tetrahydrofuran
Measurement temperature: 40° C., Flow rate: 1 ml/min
Injection volume: 150 μl
Concentration: 5 mg/10 cc (hydrogenated block copolymer/THF)

(3) Coupling Ratio

A coupling ratio was determined from a peak area of the coupled polymer component and a peak area of the uncoupled polymer component, obtained by the GPC.

(4) Branching Index

A branching index was calculated by dividing the weight-average molecular weight of the coupled polymer component by the weight-average molecular weight of the uncoupled polymer component, obtained by the GPC.

(5) Number of Hydroxyl Groups Contained in Polymer $^{29}$Si-NMR measurement was performed for the resultant hydrogenated block copolymer, and the number of hydroxyl groups in the polymer was calculated from a ratio of integrated values of a signal of silicon bonded to a hydroxyl group and a signal of silicon not bonded to a hydroxyl group.

(6) Transition Metal Content

Hydrogenated block copolymers obtained in Examples and Comparative Examples below were each weighed and heated at 600° C. for 3 hours to decompose organic matter, and the residue was dissolved in an aqueous hydrochloric acid solution, followed by measurement using an atomic absorption photometer.
Device: Z-6100 (product name, manufactured by Hitachi, Ltd.)

(7) Yellowing

Yellowing of a thermoplastic elastomer composition obtained by kneading was confirmed by visual observation.
  ○: No yellowing observed
  x: Yellowing observed (8) Compression Set Compression set was measured in accordance with JIS K 6262. A small test piece was compressed by 25% and heated at 40° C. for 22 hours. After the compression had been released, the test piece was allowed to stand still for 30 minutes at room temperature, followed by measurement of the thickness of the sample to calculate the compression set.

(9) MFR

An MFR value was measured in accordance with JIS K 7210. Thermoplastic elastomer compositions obtained in Examples and Comparative Examples below were each maintained at 160° C. for 4 minutes, and the sample was extruded by applying a load of 21.2 N, followed by measurement of the amount of the sample extruded in 10 minutes.

Example 1

Under a nitrogen atmosphere, a dried pressure vessel was charged with 3,400 ml of cyclohexane as a solvent and 5.1 ml of sec-butyl lithium at a concentration of 10.5 wt % as an initiator, and the mixture was heated to 50° C. Then, 90 ml of a mixture including isoprene and butadiene at a mass ratio of 50/50 was added to perform polymerization for 2 hours. Subsequently, 150 ml of styrene were added to perform polymerization for 1 hour, and 212 ml of a mixture including isoprene and butadiene at a mass ratio of 50/50 was added to perform polymerization for 2 hours. Then, the mixture was heated to 70° C., and 5.65 g of a solution of 5 wt % tetraethoxysilane (TEOS) in THF was added to perform a coupling reaction for 2 hours. Subsequently, 4.1 ml of t-butyl magnesium bromide at a concentration of 1 mol/L (THF solution) was added to perform a reaction for 4 hours. Then, 0.35 ml of methanol was added to terminate polymerization, to thereby obtain a polymerization reaction solution containing a block copolymer. To the reaction mixture was added 60 ml of cobalt neodecanoate-triethyl aluminum (0.0962 mol/L cyclohexane solution) as a hydrogenation catalyst to perform a hydrogenation reaction at a hydrogen pressure of 2 MPa and 150° C. for 10 hours. After cooling and pressure release, an aqueous phosphoric acid solution was added under an air atmosphere, followed by washing with water. The resultant product was further vacuum dried to obtain a hydrogenated block copolymer (hereinafter, referred to as hydrogenated block copolymer (R-1)).

The hydrogenated block copolymer (R-1) was found to have a styrene content of 39% by mass, a hydrogenation degree of 98.3%, a vinyl bond amount of 5.1%, a weight-average molecular weight of 233,600, a coupling ratio of 82%, a branching index of 2.30, a transition metal content of 8 ppm, and a number of hydroxyl groups of 0.5.

Example 2

Under a nitrogen atmosphere, a dried pressure vessel was charged with 3,400 ml of cyclohexane as a solvent and 6.2 ml of sec-butyl lithium at a concentration of 10.5 wt % as an initiator, and the mixture was heated to 50° C. Then, 80 ml of a mixture including isoprene and butadiene at a mass ratio of 50/50 was added to perform polymerization for 2 hours. Subsequently, 233 ml of styrene was added to perform polymerization for 1 hour, and 402 ml of a mixture including isoprene and butadiene at a mass ratio of 50/50 was added to perform polymerization for 2 hours. Then, the mixture was heated to 70° C., and 13.5 g of a solution of 5 wt % bistriethoxysilylethane (BESE) in THF was added to perform a coupling reaction for 2 hours. Subsequently, 7.0 ml of sec-butyl lithium at the same concentration mentioned above was added to perform a reaction for 6 hours. Then, 0.35 ml of methanol was added to terminate polymerization, to thereby obtain a polymerization reaction solution containing a block copolymer. To the reaction mixture was added 60 ml of cobalt neodecanoate-triethyl aluminum (0.0962 mol/L cyclohexane solution) as a hydrogenation catalyst to perform a hydrogenation reaction at a hydrogen pressure of 2 MPa and 150° C. for 10 hours. After cooling and pressure release, an aqueous phosphoric acid solution was added under an air atmosphere, followed by washing with water. The resultant product was further vacuum dried to obtain a hydrogenated block copolymer (hereinafter, referred to as hydrogenated block copolymer (R-2)).

The hydrogenated block copolymer (R-2) was found to have a styrene content of 40% by mass, a hydrogenation degree of 97.8%, a vinyl bond amount of 4.1%, a weight-average molecular weight of 346,000, a coupling ratio of 83%, a branching index of 3.14, a transition metal content of 20 ppm, and a number of hydroxyl groups of 0.7.

Example 3

Under a nitrogen atmosphere, a dried pressure vessel was charged with 3,400 ml of cyclohexane as a solvent and 7.3 ml of sec-butyl lithium at a concentration of 10.5 wt % as an initiator, and the mixture was heated to 50° C. Then, 156 ml of a mixture including isoprene and butadiene at a mass ratio of 50/50 was added to perform polymerization for 2 hours. Subsequently, 257 ml of styrene was added to perform polymerization for 1 hour, and 378 ml of a mixture including isoprene and butadiene at a mass ratio of 50/50 was added to perform polymerization for 2 hours. Then, the mixture was heated to 70° C., and 15.0 g of a solution of 5 wt % bistriethoxysilylethane (BESE) in THF was added to perform a coupling reaction for 2 hours. Subsequently, 6.6 ml of t-butyl magnesium bromide at a concentration of 1 mol/L (THF solution) was added to perform a reaction for 4 hours. Then, 0.35 ml of methanol was added to terminate polymerization, to thereby obtain a polymerization reaction solution containing a block copolymer. To the reaction mixture was added 100 ml of cobalt neodecanoate-triethyl aluminum (0.0962 mol/L cyclohexane solution) as a hydrogenation catalyst to perform a hydrogenation reaction at a hydrogen pressure of 2 MPa and 150° C. for 10 hours. After cooling and pressure release, an aqueous phosphoric acid solution was added under an air atmosphere, followed by washing with water. The resultant product was further vacuum dried to obtain a hydrogenated block copolymer (hereinafter, referred to as hydrogenated block copolymer (R-3)).

The hydrogenated block copolymer (R-3) was found to have a styrene content of 44% by mass, a hydrogenation degree of 97.0%, a vinyl bond amount of 3.8%, a weight-average molecular weight of 339,000, a coupling ratio of 85%, a branching index of 2.76, a transition metal content of 88 ppm, and a number of hydroxyl groups of 0.8.

Example 4

Under a nitrogen atmosphere, a dried vessel was charged with 3,400 ml of cyclohexane as a solvent and 6.2 ml of sec-butyl lithium at a concentration of 10.5 wt % as an initiator, and the mixture was heated to 50° C. Then, 104 ml of a mixture including isoprene and butadiene at a mass ratio of 50/50 was added to perform polymerization for 2 hours. Subsequently, 184 ml of styrene was added to perform polymerization for 1 hour, and 271 ml of a mixture including isoprene and butadiene at a mass ratio of 50/50 was added to perform polymerization for 2 hours. Then, the mixture was heated to 70° C., and 10.5 g of a solution of 5 wt % bistriethoxysilylethane (BESE) in THF was added to perform a coupling reaction for 2 hours. Subsequently, 0.20 ml of methanol was added to terminate polymerization, to thereby obtain a polymerization reaction solution containing a block copolymer. To the reaction mixture was added 60 ml of cobalt neodecanoate-triethyl aluminum (0.0962 mol/L cyclohexane solution) as a hydrogenation catalyst to perform a hydrogenation reaction at a hydrogen pressure of 2 MPa and 150° C. for 10 hours. Further, 6.6 ml of t-butyl magnesium bromide at a concentration of 1 mol/L (THF solution) was added to perform a reaction for 2 hours. After cooling and pressure release, an aqueous phosphoric acid solution was added under an air atmosphere, followed by washing with water. The resultant product was further vacuum dried to obtain a hydrogenated block copolymer (hereinafter, referred to as hydrogenated block copolymer (R-4)).

The hydrogenated block copolymer (R-4) was found to have a styrene content of 40% by mass, a hydrogenation degree of 97.8%, a vinyl bond amount of 4.5%, a weight-average molecular weight of 267,700, a coupling ratio of 80%, a branching index of 2.62, a transition metal content of 49 ppm, and a number of hydroxyl groups of 1.3.

Comparative Example 1

Under a nitrogen atmosphere, a dried pressure vessel was charged with 3,400 ml of cyclohexane as a solvent and 7.2 ml of sec-butyl lithium at a concentration of 10.5 wt % as an initiator, and the mixture was heated to 50° C. Then, 151 ml of a mixture including isoprene and butadiene at a mass ratio of 50/50 was added to perform polymerization for 2 hours. Subsequently, 249 ml of styrene was added to perform polymerization for 1 hour, and 366 ml of a mixture including isoprene and butadiene at a mass ratio of 50/50 was added to perform polymerization for 2 hours. Then, the mixture was heated to 70° C., and 16.6 g of a solution of 5 wt % tetraethoxysilane (TEOS) in THF was added to perform a coupling reaction for 2 hours. Subsequently, 0.35 ml of methanol was added to terminate polymerization, to thereby obtain a polymerization reaction solution containing a block copolymer. To the reaction mixture was added 60 ml of cobalt neodecanoate-triethyl aluminum (0.0962 mol/L cyclohexane solution) as a hydrogenation catalyst to perform a hydrogenation reaction at a hydrogen pressure of 2 MPa and 150° C. for 10 hours. After cooling and pressure release, an aqueous phosphoric acid solution was added under an air atmosphere, followed by washing with water. The resultant product was further vacuum dried to obtain a hydrogenated block copolymer (hereinafter, referred to as hydrogenated block copolymer (H-1)).

The hydrogenated block copolymer (H-1) was found to have a styrene content of 41% by mass, a hydrogenation degree of 97.4%, a vinyl bond amount of 5.1%, a weight-average molecular weight of 252,700, a coupling ratio of 77%, a branching index of 2.38, a transition metal content of 518 ppm, and a number of hydroxyl groups of 1.6.

Comparative Example 2

Under a nitrogen atmosphere, a dried pressure vessel was charged with 3,400 ml of cyclohexane as a solvent and 6.2 ml of sec-butyl lithium at a concentration of 10.5 wt % as an initiator, and the mixture was heated to 50° C. Then, 130 ml of a mixture including isoprene and butadiene at a mass ratio of 50/50 was added to perform polymerization for 2 hours. Subsequently, 221 ml of styrene was added to perform polymerization for 1 hour, and 326 ml of a mixture including isoprene and butadiene at a mass ratio of 50/50 was added to perform polymerization for 2 hours. Then, the mixture was heated to 70° C., and 12.9 g of a solution of 5 wt % bistriethoxysilylethane (BESE) in THF was added to perform a coupling reaction for 2 hours. Subsequently, 0.3 ml of methanol was added to terminate polymerization, to thereby obtain a polymerization reaction solution containing a block copolymer. To the reaction mixture was added 101 ml of cobalt neodecanoate-triethyl aluminum (0.0962 mol/L cyclohexane solution) as a hydrogenation catalyst to perform a hydrogenation reaction at a hydrogen pressure of 2 MPa and 150° C. for 10 hours. After cooling and pressure release, an aqueous phosphoric acid solution was added under an air atmosphere, followed by washing with water. The resultant product was further vacuum dried to obtain a hydrogenated block copolymer (hereinafter, referred to as hydrogenated block copolymer (H-2)).

The hydrogenated block copolymer (H-2) was found to have a styrene content of 40% by mass, a hydrogenation degree of 96.5%, a vinyl bond amount of 5.4%, a weight-average molecular weight of 339,000, a coupling ratio of 85%, a branching index of 2.70, a transition metal content of 466 ppm, and a number of hydroxyl groups contained of 3.4.

Comparative Example 3

Under a nitrogen atmosphere, a dried pressure vessel was charged with 3,400 ml of cyclohexane as a solvent and 6.2 ml of sec-butyl lithium at a concentration of 10.5 wt % as an initiator, and the mixture was heated to 50° C. Then, 80 ml of a mixture including isoprene and butadiene at a mass ratio of 50/50 was added to perform polymerization for 2 hours. Subsequently, 233 ml of styrene was added to perform polymerization for 1 hour, and 402 ml of a mixture including isoprene and butadiene at a mass ratio of 50/50 was added to perform polymerization for 2 hours. Then, the mixture was heated to 70° C., and 13.5 g of a solution of 5 wt % bistriethoxysilylethane (BESE) in THF was added to perform a coupling reaction for 2 hours. Subsequently, 1.8 ml of sec-butyl lithium at a concentration of 10.5 wt % was added to perform a reaction for 6 hours. Then, 0.35 ml of methanol was added to terminate polymerization, to thereby obtain a polymerization reaction solution containing a block copolymer. To the reaction mixture was added 60 ml of cobalt neodecanoate-triethyl aluminum (0.0962 mol/L cyclohexane solution) as a hydrogenation catalyst to perform a hydrogenation reaction at a hydrogen pressure of 2 MPa and 150° C. for 10 hours. After cooling and pressure release, an aqueous phosphoric acid solution was added under an air atmosphere, followed by washing with water. The resultant product was further vacuum dried to obtain a hydrogenated block copolymer (hereinafter, referred to as hydrogenated block copolymer (H-3)).

The hydrogenated block copolymer (H-3) was found to have a styrene content of 40% by mass, a hydrogenation degree of 97.8%, a vinyl bond amount of 4.1%, a weight-average molecular weight of 346,000, a coupling ratio of 83%, a branching index of 3.14, a transition metal content of 586 ppm, and a number of hydroxyl groups of 1.7.

Physical properties of the hydrogenated block copolymers obtained in Examples 1 to 4 and Comparative Examples 1 to 3 are shown in Table 1 below.

As shown in Table 1, the hydrogenated block copolymers obtained in Examples 1 to 4 by methods including the step (d) of deactivating the functional groups in the coupling agent, in which the numbers of hydroxyl groups are 1.5 or less, have transition metal contents of 100 ppm or less. On the other hand, the hydrogenated block copolymers obtained in Comparative Examples 1 to 2 by methods not including the step (d), in which the numbers of hydroxyl groups are 1.5 or more, have large transition metal contents. Comparative Example 3 includes the step of deactivating the functional groups in the coupling agent, but the hydrogenated block copolymer has a large transition metal content because the number of the functional groups is 1.5 or more.

Examples 5 to 8 and Comparative Examples 4 to 6

The hydrogenated block copolymers (R-1) to (R-4) and (H-1) to (H-3) obtained in Examples 1 to 4 and Comparative Examples 1 to 3 were each blended with a non-aromatic rubber softener and an antioxidant such that 500 parts by mass of the non-aromatic rubber softener was blended with respect to 100 parts by mass of the hydrogenated block copolymer and the antioxidant was blended at a mass ratio shown in Table 2, and the components were premixed and then melt-kneaded at 170° C. for 5 minutes using a Brabender mixer. After that, the mixture was pressed into a test piece for compression set measurement using a press molding machine. The performance of the resultant thermoplastic elastomer composition was evaluated in accordance with the methods (7) to (9) above. The results are shown in Table 2. It should be noted that the following products were used as the non-aromatic rubber softener and antioxidant.

Non-aromatic rubber softener: paraffin-based process oil, product name: Diana process oil PW-32, manufactured by Idemitsu Kosan Co., Ltd., kinetic viscosity at 40° C.: 30.98 mm$^2$/s Antioxidant: hindered phenol-based antioxidant, product name: IRGANOX 1010, manufactured by Ciba Specialty Chemicals

TABLE 1

|  | Example 1 | Example 2 | Example 3 | Example 4 | Comparative Example 1 | Comparative Example 2 | Comparative Example 3 |
|---|---|---|---|---|---|---|---|
| Hydrogenated block copolymer | R-1 | R-2 | R-3 | R-4 | H-1 | H-2 | H-3 |
| Coupling agent | TEOS | BESE | BESE | BESE | TEOS | BESE | BESE |
| Steps* | β | β | β | γ | α | α | β |
| Molar ratio of deactivating reagent/functional group Y remaining after coupling reaction | 1.8 | 1.5 | 1.0 | 1.4 | — | — | 0.39 |
| Weight-average molecular weight of uncoupled polymer component before hydrogenation | 93,200 | 108,100 | 112,220 | 105,500 | 103,900 | 120,200 | 108,100 |
| Coupling ratio (%) | 82 | 83 | 85 | 80 | 77 | 85 | 83 |
| Branching index (—) | 2.30 | 3.14 | 2.76 | 2.62 | 2.38 | 2.70 | 3.14 |
| Number of hydroxyl groups (group(s)/molecule) | 0.5 | 0.7 | 0.8 | 1.3 | 1.6 | 3.4 | 1.7 |
| Transition metal content (ppm) | 8 | 20 | 88 | 49 | 518 | 466 | 586 |

*Steps . . . α: Step (a) → Step (b) → Step (c)
β: Step (a) → Step (d) → Step (b) → Step (c)
γ: Step (a) → Step (b) → Step (d) → Step (c)

TABLE 2

| | Example 5 | Example 6 | Example 7 | Example 8 | Comparative Example 4 | Comparative Example 5 | Comparative Example 6 |
|---|---|---|---|---|---|---|---|
| Hydrogenated block copolymer | R-1 | R-2 | R-3 | R-4 | H-1 | H-2 | H-3 |
| Additive amount of antioxidant (part(s) by mass) | 0.6 | 0.3 | 0.5 | 0.4 | 1.5 | 1.4 | 1.5 |
| Yellowing | ○ | ○ | ○ | ○ | x | x | x |
| Compression set (40° C., 22 hr) (%) | 31 | 17 | 9 | 20 | 16 | 11 | 19 |
| MFR (160° C., 21.2 N) (g/10 min) | 430 | 411 | 286 | 520 | 490 | 331 | 457 |

As shown in Table 2, the thermoplastic elastomer compositions obtained by kneading in Examples 5 to 8 did not turn yellow because the hydrogenated block copolymers used had low transition metal contents. On the other hand, in Comparative Examples 4 to 6, the thermoplastic elastomer compositions obtained by kneading turned yellow because the hydrogenated block copolymers used had high transition metal contents.

INDUSTRIAL APPLICABILITY

Each of the hydrogenated block copolymer obtained by the production method of the present invention and the thermoplastic elastomer composition containing the copolymer includes no substance which causes environmental pollutions or deterioration of the composition, such as a transition metal, and hence can be used effectively in wide range of applications such as buffer materials, damping materials, sealants, grips, toys, and sundry articles.

The invention claimed is:

1. A method for producing a hydrogenated block copolymer, the method comprising:
(a-1) polymerizing monomers with an alkyl lithium compound as an initiator in an inert solvent, thereby obtaining a living anionic polymer of formula (I):

P—X    (I)

where P is a copolymer chain comprising, in reacted form, an aromatic vinyl compound polymer block (A) and a conjugated diene polymer block (B), and X is an active terminal of the living anionic polymer;
(a-2) reacting a silane coupling agent having a functionality of at least four, with the living anionic polymer of formula (I) after the polymerizing (a-1) monomers to obtain a block copolymer;
(b) hydrogenating the block copolymer to obtain a hydrogenated block copolymer;
(c) isolating the hydrogenated block copolymer to obtain an isolated hydrogenated block copolymer; and
(d) adding a Lewis base to the block copolymer or the hydrogenated block copolymer after said (a-2) reacting of the silane coupling agent with the living polymer such that (i) a functional group of the silane coupling agent, (ii) an unreacted functional group present in a coupling agent residue in the block copolymer or the hydrogenated block copolymer, or both (i) and (ii) is deactivated with the Lewis base,
wherein:
the Lewis base is at least one member selected from the group consisting of an alkyl lithium compound, an alkyl sodium compound, an alkyl potassium compound, an alkyl magnesium halide compound, a dialkyl copper lithium compound, and lithium amide compound;
each of (a-1) and (a-2) are carried out before said (b) hydrogenating, said (b) hydrogenating is carried out before said (d) deactivating, and said (d) deactivating is carried out before said (c) isolating; or
each of (a-1) and (a-2) are carried out before said (d) deactivating, said (d) deactivating is carried out before said (b) hydrogenating, and said (b) hydrogenating is carried out before said (c) isolating; and
a number of functional groups derived from the coupling agent in the isolated hydrogenated block copolymer is 1.5 or less per block copolymer molecule.

2. The method of claim 1, wherein the silane coupling agent comprises a compound of formula (II):

$SiY_4$    (II)

wherein each Y is independently a fluorine atom, a chlorine atom, a bromine atom, an iodine atom, an alkoxy group, a carboxyl group, or a carboxylic acid ester group; or the silane coupling agent comprises a compound of formula (III):

$R^1_m Y_{3-m} Si\text{-}A\text{-}SiY_{3-m} R^1_m$    (III)

wherein each $R^1$ is independently a hydrogen atom, an aryl group having 6 to 12 carbon atoms, or a linear or branched alkyl group having 1 to 12 carbon atoms; each Y is independently a fluorine atom, a chlorine atom, a bromine atom, an iodine atom, an alkoxy group, a carboxyl group, or a carboxylic acid ester group; A is a single bond or a linear alkylene group having 1 to 20 carbon atoms; and m is 0 or 1.

3. The method of claim 2 wherein each Y in formulae (II) or (III) is an alkoxy group $OR^2$, wherein each $R^2$ is independently a linear or branched alkyl group having 1 to 12 carbon atoms.

4. The method of claim 1, wherein the functional groups derived from the coupling agent in the hydrogenated block copolymer comprise hydroxyl groups bonded directly to Si atoms.

5. The method of claim 1, wherein the living polymer has a weight-average molecular weight of 8,000 to 500,000.

6. The method of claim 2, wherein the deactivating is performed in the presence of a deactivating reagent, and a molar ratio of the deactivating reagent to the Y in the coupling agent residue is 0.5 or more.

7. The method of claim 1, wherein the polymer block (A) comprises, in reacted form, at least one aromatic vinyl compound selected from the group consisting of styrene, α-methylstyrene, 2-methylstyrene, 3-methylstyrene, 4-methylstyrene, 4-propylstyrene, 4-cyclohexylstyrene, 4-dodecylstyrene, 2-ethyl-4-benzylstyrene, 4-(phenylbutyl)styrene, 1-vinylnaphthalene and 2-vinylnaphthalene.

8. The method of claim 7, wherein the polymer block (A) comprises, in reacted form, styrene.

9. The method of claim 7, wherein the polymer block (A) comprises, in reacted form, α-methylstyrene.

10. The method of claim 1, wherein the polymer block (B) comprises, in reacted form, at least one conjugated diene selected from the group consisting of 1,3-butadiene, isoprene, 2,3-dimethyl-1,3-butadiene, 1,3-pentadiene, and 1,3-hexadiene.

11. The method of claim 10, wherein the polymer block (B) comprises, in reacted form, 1,3-butadiene and isoprene.

12. The method of claim 1, wherein the living polymer has a weight-average molecular weight of 60,000 to 300,000.

13. The method of claim 1, wherein the coupling agent is selected from the group consisting of tetramethoxysilane, tetraethoxysilane, tetrapropoxysilane, tetrabutoxysilane, bisdimethoxymethylsilylethane, bisdiethoxymethylsilylethane, bisdiethoxyethylsilylpentane, bisdibutoxymethylsilylethane, bistrimethoxysilylhexane, bistriethoxysilylethane, and bistripropoxysilylpentane.

14. The method of claim 1, wherein a molar ratio of the coupling agent to the active terminal is 0.1 to 0.5.

15. The method of claim 6, wherein the molar ratio of the deactivating reagent to the Y in the coupling agent residue is 1.0 or more.

16. The method of claim 1, wherein the Lewis base comprises at least one member selected from the group consisting of
an alkyl sodium compound, an alkyl potassium compound, an alkyl magnesium halide compound, a dialkyl copper lithium compound, and lithium amide compound.

* * * * *